United States Patent
Komninos

(10) Patent No.: US 8,872,652 B2
(45) Date of Patent: Oct. 28, 2014

(54) METHOD AND APPARATUS FOR WIRELESS COMMUNICATION IN TEST, MEASUREMENT, CONTROL, AND COMMUNICATION SYSTEMS

(75) Inventor: Nikolaos I. Komninos, Lone Tree, CO (US)

(73) Assignee: Radiaulics, Inc., Lone Tree, CO (US)

(*) Notice: Subject to any disclaimer, the term of this patent is extended or adjusted under 35 U.S.C. 154(b) by 253 days.

(21) Appl. No.: 12/788,207

(22) Filed: May 26, 2010

(65) Prior Publication Data

US 2010/0302031 A1  Dec. 2, 2010

Related U.S. Application Data

(60) Provisional application No. 61/181,142, filed on May 26, 2009.

(51) Int. Cl.
- *G09B 5/00* (2006.01)
- *G09B 25/00* (2006.01)
- *H04B 7/00* (2006.01)
- *G08B 21/00* (2006.01)
- *H04L 12/28* (2006.01)

(52) U.S. Cl.
CPC .................................. *H04L 12/2818* (2013.01)
USPC ...... 340/539.26; 340/945; 455/519; 434/308; 434/309; 434/379

(58) Field of Classification Search
None
See application file for complete search history.

(56) References Cited

U.S. PATENT DOCUMENTS

| | | | | |
|---|---|---|---|---|
| 5,668,542 A | * | 9/1997 | Wright | 340/971 |
| 7,817,050 B2 | * | 10/2010 | Goodman et al. | 340/632 |
| 8,006,002 B2 | * | 8/2011 | Kalayjian et al. | 710/36 |
| 2003/0179089 A1 | * | 9/2003 | Sweatt | 340/539.1 |
| 2006/0197660 A1 | * | 9/2006 | Luebke et al. | 340/539.26 |
| 2006/0223442 A1 | * | 10/2006 | Stephens | 455/67.11 |
| 2006/0272704 A1 | * | 12/2006 | Fima | 137/12 |
| 2007/0236366 A1 | * | 10/2007 | Gur et al. | 340/945 |
| 2008/0075295 A1 | * | 3/2008 | Mayman et al. | 381/79 |
| 2008/0129495 A1 | * | 6/2008 | Hitt | 340/539.26 |
| 2009/0043909 A1 | * | 2/2009 | Patton et al. | 709/232 |
| 2009/0218657 A1 | * | 9/2009 | Rofougaran | 257/531 |
| 2010/0290788 A1 | * | 11/2010 | Feldstein et al. | 398/116 |

* cited by examiner

Primary Examiner — George Bugg
Assistant Examiner — Renee Dorsey
(74) Attorney, Agent, or Firm — Dorr, Carson & Birney, P.C.

(57) ABSTRACT

A system for wireless multiple user access to a sensor comprises a sensor unit having a sensor element, a sensor user interface, and a sensor wireless transceiver that transmits information corresponding to the output of the sensor user interface. One or more receiving units each receive the information corresponding to the output of the sensor user interface, and provide that output to a receiver user interface. The receiver may be located near the sensor unit, or may be located remotely from the sensor unit. Multiple receiving units may be used, for example, by students receiving training on the use of a sensor unit.

12 Claims, 5 Drawing Sheets

METHOD AND APPARATUS FOR WIRELESS COMMUNICATION IN TEST, MEASUREMENT, CONTROL, AND COMMUNICATION SYSTEMS

CROSS REFERENCE TO RELATED APPLICATIONS

This applications claims priority to U.S. provisional patent application Ser. No. 61/181,142, filed on May 26, 2009, the entire disclosure of which is incorporated herein by reference.

FIELD

The present disclosure is directed to wireless transmission of information in test, measurement, control, and communication systems, and more particularly, to multi-user access to information in such systems.

BACKGROUND

Test, measurement, control, and communication systems, (TMCCS) are well known. It is common for these types of devices to produce audio and display outputs that inform a user of the measurement result, confirm selections, or inform of a condition. Examples are the output of audio amplifiers used as troubleshooting tools, listening tools for person locators, stethoscopes, ultrasonic leak detectors, ultrasonic sound detectors and condition monitors, sniffer type leak detectors, sonic grease guns, ultrasonic grease guns, thermometers (contact and infra red), thermography cameras, video cameras, digital cameras, walkie-talkie radio systems, telemetry systems, Wire tracers, multimeters, utility locators, pipe locators, and radiation detectors such as RF, X-Ray, $\alpha$, $\beta$, $\gamma$, Infrared, Ultra-Violet, ELF and others. This list of test instruments and devices is exemplary of the possible types of devices that communicate with an operator and is not by any means a complete list of such devices.

As mentioned above, it is common for these types of devices to provide an audio and/or visual output through which a user may determine a status or condition of the particular device. Additionally, many of these devices require a significant amount of skill and experience to operate and interpret the output of the device. In some cases, even experienced and skilled operators may require other opinions in the interpretation of the output of a particular device. Because many of these types of devices require significant skill and experience to operate, training of new operators can be time consuming and cumbersome.

SUMMARY

The present disclosure provides wireless systems and methods for transmission of sensor, or other device, audio output audio to one or more users. In one aspect, the present disclosure provides a system for multiple user access to a sensor, comprising: (a) a sensor unit comprising a sensor element, a sensor user interface, and a sensor wireless transceiver that transmits information corresponding to the output of the sensor user interface; and (b) one or more receiving units each comprising a receiver wireless transceiver that receives the information corresponding to the output of the sensor user interface, and a receiver user interface connected to the receiver wireless transceiver that outputs information related to the sensor user interface.

The sensor may be any type of sensing or measuring device that provides output to a user interface, and in one embodiment is a leak detector, such as an ultrasonic leak detector or sniffer-type leak detector, that provides an audio output that is used to determine if the sensor is detecting a leak condition. The sensor user interface may include an amplifier and a speaker, a headset jack interface, and the like. In one embodiment, the sensor unit further comprises an analog to digital converter interconnected to the sensor element that outputs digital information related to the state of the sensor element, and the sensor wireless transceiver transmits the digital information. The sensor wireless transceiver may be, for example, a FM transmitter or a spread spectrum transceiver.

In some embodiments, one or more of the receiving units may also include a network interface and provide information related to the output of the sensor user interface to the network interface. In such a case, a remote receiving unit having a network interface may receive the information related to the sensor output from the first receiving unit over a network external to the first and remote receiving units. Similarly, the sensor unit may include a network interface and provides information related to the output of the sensor user interface to the network interface. In such a case, a remote receiving unit having a network interface may receive the information related to the output of the sensor user interface from the sensor unit over a network external to the sensor unit and receiving units.

In another aspect, the present disclosure provides a method for multiple user access to a sensing device output, comprising: (a) providing a sensing device having a sensor element and a sensor wireless transceiver electrically interconnected to the sensor element; (b) transmitting information related to the current state of the sensor element using the sensor wireless transceiver; (c) receiving, at one or more receiving units, the information related to the current state of the sensor element from the sensor wireless transceiver; and (d) at each receiving unit, outputting the information related to the current state of the sensor element to a receiving unit user interface. The receiving unit user interface may include a headset that provides audio output corresponding to the information related to the current state of the sensor element. The sensing device may be any of a number of different sensing devices or a combination thereof, and in one embodiment is a leak detector, such as an ultrasonic leak detector or sniffer-type leak detector, that provides an audio output that is used to determine if the sensor is detecting a leak condition. The method of this aspect may also comprise transmitting, from one of the receiving units, the information related to the current state of the sensor element over a network, such as the Internet, external to the receiving unit. In embodiments with such an external network, a remote receiving unit interconnected to the external network may receive the information related to the current state of the sensor element from the first receiving unit, and output the information related to the current state of the sensor element to a remote receiving unit user interface.

In still another aspect, the present disclosure provides an apparatus for wirelessly transmitting sensor information from a sensing device to two or more receiving devices, comprising: (a) a sensing device interface adapted to be interconnected to an output of a sensing device; and (b) a wireless transceiver electrically interconnected to the sensing device interface that receives the output of the sensing device and is adapted to wirelessly transmit the output of the sensing device to one or more receiving devices. The sensing device may be any of a number of different sensing devices, and in one embodiment is a leak detector, such as an ultrasonic leak detector or sniffer-type leak detector, that provides an audio output that is used to determine if the sensor is detecting a leak condition. The sensing device interface may include, for example, a microphone configured to be mounted adjacent to a speaker output of the sensing device. The wireless transceiver may be, for example, a FM transceiver or a spread spectrum wireless transceiver.

DETAILED DESCRIPTION

Figure 1:
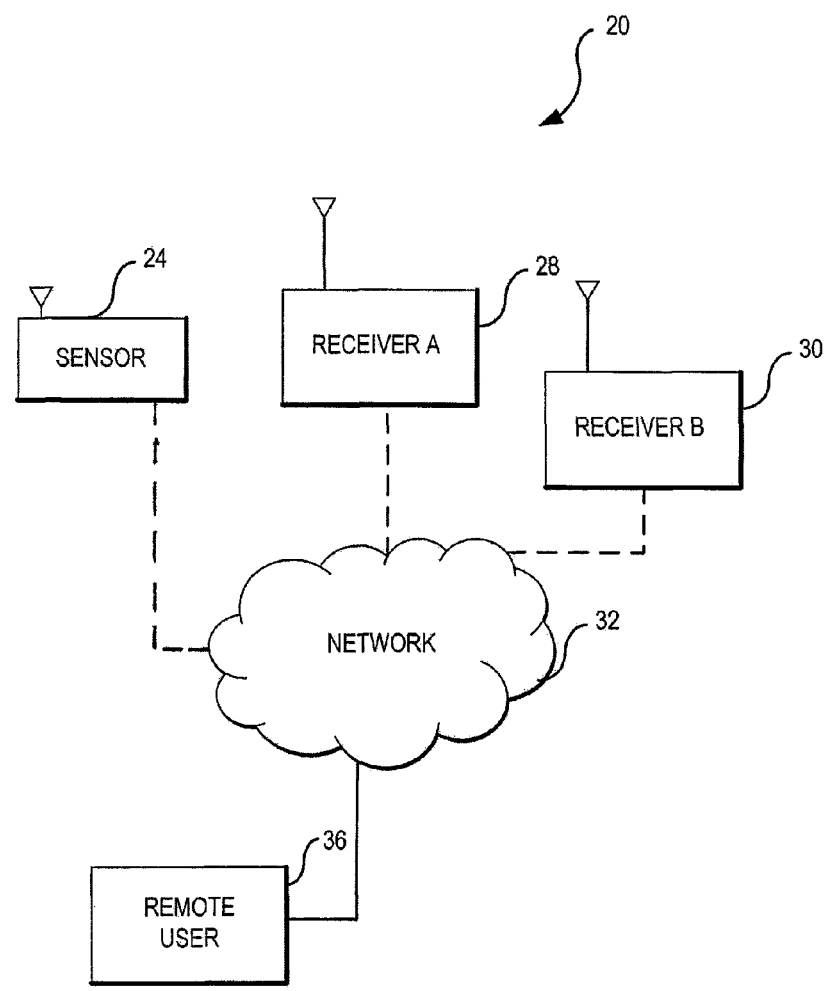
FIG. 1 is a block diagram illustration of a wireless sensor system of an exemplary embodiment.

As mentioned above, various types of devices include audio output that a user may utilize when operating the device. Example devices described in several exemplary embodiments herein include leak detectors such as sniffer-type leak detectors, or ultrasonic leak detectors, although it is to be understood that the principals described apply equally to other types of devices as well. The word "exemplary" is used herein to mean "serving as an example, instance, or illustration." Any embodiment described herein as "exemplary" is not necessarily to be construed as preferred or advantageous over other embodiments.

Generally, as is well known, a leak detector may be used to assist in detecting leaks in particular systems that operate using a particular type of gas. For example, many residential properties contain several appliances that operate using natural gas, and a sniffer-type leak detector may be used to detect a leak in such natural gas pipes. Such a sniffer-type device contains a sensor element that is tuned to detect the presence of a target gas, even in trace amounts. Sniffer type leak detectors may include sensor elements tuned for detection of numerous gases of interest, and may include, for example, heated diodes or triodes tuned to detect gases of interest, corona discharge sensors, thermal conductivity sensors, photo ionization sensors, infrared light sensors (NDIR), selective ion pump detection sensors, Helium or Hydrogen sensors, combustible gas sensors, ammonia gas sensors, CO & $CO_2$ sensors, $SF_6$ sensors, and Oxygen sensors. The sensor of such a sniffer is connected to an output that typically produces an audible output at a certain frequency. In the event that the sensor detects the presence of the particular gas of interest, indicating a potential gas leak, the frequency of the audible output increases, resulting in a higher pitched output, for example. The greater the concentration of gas at the sensor element, the higher the frequency increase, thus providing an indication related to the magnitude of the potential leak, which may be used by a skilled operator to assess the current situation for potential safety hazards, for example.

Similarly, ultrasonic leak detectors commonly produce an audio output. Ultrasonic gas detectors, as are well known, use acoustic sensors to detect changes in the background noise of its environment. These types of leak detectors are commonly used to detect leaks in relatively high pressure systems, where most gas leaks occur in the ultrasonic range of 25 kHz to 10 MHz. Sensors in the ultrasonic leak detectors are able to distinguish these frequencies from background noise. Ultrasonic gas leak detectors produce an alarm when the sensor detects an ultrasonic deviation from the normal condition of background noise. These types of leak detectors do not measure gas concentration, although many such devices are able to provide an indication of the leak rate of an escaping gas. By measuring the ultrasonic sound level associated with the leak, the detector is able to determine the leak rate, which depends on the gas pressure and size of the leak. The bigger the leak, the larger its ultrasonic sound level will be. Ultrasonic leak detectors are commonly used for outdoor environments where weather conditions can easily dissipate escaping gas before allowing it to reach gas leak detectors that require contact with the gas in order to sound an alarm. These detectors are commonly found on offshore and onshore oil/gas platforms, gas compressor and metering stations, gas turbine power plants, and other facilities having outdoor pipeline.

Devices such as those described above lack the ability to communicate output with a user that is not directly adjacent, or within a relatively close distance, to the device. Furthermore, such devices often require that the operator be tethered to the instrument, such as through a cable connecting headphones through a headphone jack and output interface, which presents a potential safety hazard to a user while moving near machinery or other objects. Additionally the ability to share the device output with other users that are not directly adjacent to the device, in order to help with the task at hand is difficult, if not impossible, if multiple wires must be attached to the audio generating device, thereby further increasing the safety hazard.

Additionally, in training applications where an instructor is demonstrating the use of an instrument to a group, the instructor commonly is required to perform several demonstrations to individuals or small groups because of the proximity requirement. In a group setting, this can be inefficient and also reduces opportunities for others in a group to hear questions and answers of other group members, and/or dialogue related to the equipment. The use of a transceiver in the instructors headset for example (but not limited there) and the use of a microphone will allow the instructor to transmit his comments and/or instructions to the sensor (instrument) where the internal transceiver will receive such signal and mix it with the signal generated by the sensor to be broadcast to the class or coworkers. Additionally the use of transceivers and microphones with all students will permit communication among all participating in the class or demonstration.

There are a multitude of wireless standards used in the marketplace today, such as the commonly used Bluetooth standard. Users of such wireless communication technology connect with their mobile phone, other audio devices, or computer peripheral devices, to another device. Headsets with wires or wireless are designed to convey the information from the generating device to a single recipient because the idea is to restrict others from listening in. Broadcast systems do exist such as the ones found for example in portable DVD players or in automobiles for listening the soundtrack of a movie, but in these applications the source is stationary and not part of a device where the user is interacting with it and with the environment such as in test instruments.

In various exemplary embodiments described herein, systems are provided that incorporate a sound transmitter and/or a transceiver within a test instrument, enabling wireless transmission of the instrument output. Such a system adds flexibility, safety and the ability to efficiently train others. In particular when using ultrasonic leak detectors the speed of detection and location of a leak depends on the sound quality of the translated sound to the ears of the operator. Most, if not all, ultrasonic leak detectors use a headset so the operator can hear the translated sound generated by the detector. The headset requires a physical connection to the detector which can be a nuisance in some cases, and can present a safety hazard on some cases. Furthermore, if two or more users need to hear the sound, and/or get trained to the intricacies and peculiarities of the sounds of leaks or the lubrication condition and wear in bearings, then the multiple users must be tethered to the same instrument making the movement cumbersome, at best. Similarly with sonic detectors which are used in detecting water leakage or other types of underground leaks, training another operator is equally difficult.

In one embodiment, a radio transmitter is embedded in the test instrument and a receiver embedded in the headset, to provide a link between the operator and the instrument. This configuration allows the test instrument to broadcast its output, including the ability to broadcast to multiple headsets simultaneously. The actual type of transmission may be selected to fit the local regulations as far as modulation, frequencies and radiation level. Some embodiments provide simple FM transmission using low a low power FM transmitter over a regular FM radio band to facilitate the use of off the self radio receivers or radio headsets. Other embodiments use spread spectrum systems or digital radio systems. In addition to radio, still other embodiments provide an infrared system to provide the link between an instrument and one or more users. In still further embodiments, the transmitter may be switched on and off, and it can function simultaneously with a wired headset connection.

Also provided in various embodiments is a method of training students in the use of instruments during actual applications. In such cases, a student is independent of others being trained and detached physically from the instrument. In some embodiments, systems provide a method of independent verification of the results a test instrument or device generates, allowing a third party such as an inspector or supervisor to listen to the audio signal generated by the instrument.

In still further embodiments, multiple students may use their instruments independently, and an instructor may tune to each student's instrument and listen to the output of the instrument. In such a manner, the instructor may determine if the student is using their instrument correctly or interpreting correctly the results. Similarly students in group classes such music schools may practicing using such a system that is connected to their particular instrument, using wireless headsets to eliminate interfering wires with their instrument and providing an instructor with the ability to hear how individual students are playing the lesson or piece.

With reference now to the drawing figures, wireless test/detection output systems of some exemplary embodiments are described. One exemplary system 20 is illustrated in FIG. 1. In this system, a sensor 24 produces an audio output that is wirelessly transmitted to one or more receivers, such as receiver A 28 and receiver B 30, in FIG. 1. The receivers 28, 30, may be stand alone receivers that are incorporated into a headset worn by a user. In some embodiments, one or more of the receivers 28, 30, may be connected to a network 32 and a remote user 36. In these embodiments, a remotely located user may be able to access the audio output of the sensor 24. In some embodiments, receivers 28, 30 are interconnected to the network 32 through a wireless LAN connection, although it will be readily understood that any suitable wired or wireless connection may be used. The network 32 may be the Internet, an intranet, a telecommunications network, and the like. In other embodiments, the sensor 24 may include a connection to network 32 instead of, or in addition to, any receiver 28, 30, network connection.

Figure 2:
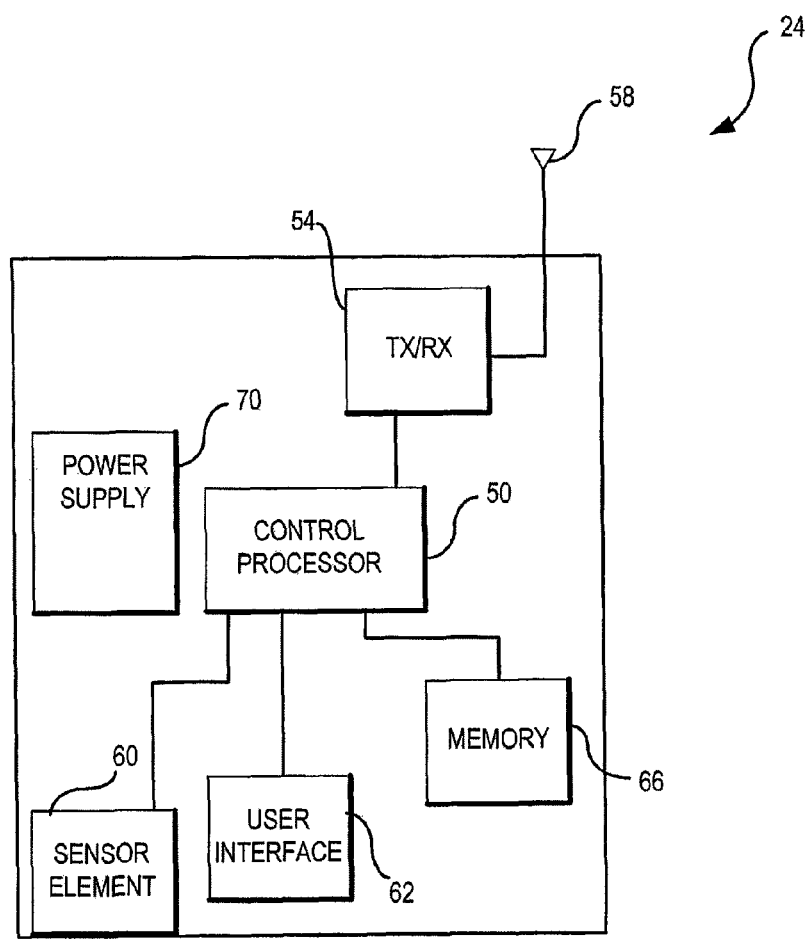
FIG. 2 is a block diagram illustration of a sensor unit of an exemplary embodiment.

With reference now to FIG. 2, a block diagram illustration of a sensor unit of an embodiment is described. In this embodiment, the sensor 24, which may be an ultrasonic leak detector or sniffer-type leak detector, for example, includes a control processor 50 connected to a transceiver 54 and antenna 58. The transceiver 54, may be any suitable wireless transceiver such as an FM transmitter that modulates an input signal onto a carrier, and transmits the modulated carrier signal via the antenna 58. The transceiver 54 may also be a digital transceiver that uses, for example, spread spectrum data transmission. Such a digital transceiver may be a Bluetooth transceiver, for example. The transceiver 54, in some embodiments, may transmit information to a wireless local area network using the IEEE 802.11 standard. In still other embodiments, the transceiver 54 communicates with a cellular telephone network. In embodiments using digital transmission techniques by the transceiver 54, the output signal from sensor element 60 may be digitized and packetized using well known techniques. In some embodiments, the control processor 50 includes an analog to digital converter to convert the sensor output to a digital output, which may then be formatted to an appropriate protocol for transmission by the transceiver 54.

A sensor element 60 is connected to the control processor 50, and provides a signal indicative of the currently sensed condition at the sensor element 60. A user interface 62 may include the type of user interface that is typical to such a sensor 24, and may include testing and calibration, as well as output, settings. The sensor unit 24, in an embodiment, includes a headset jack in the user interface, as well as the transceiver 54, that each provide output related to the currently sensed condition of the sensor element. The sensor unit 24 of this embodiment also includes a memory 66, which may be used to store sensor settings and other information. Finally, a power supply 70 provides operating power to the various sensor 24 components. The power supply 70 may include a battery power source, or a connection to an AC power source, for example. As will be readily understood by one of skill in the art, other embodiments may include sensors 24 which include a subset of the components as described in FIG. 2. Furthermore, other embodiments may include different or additional components than those illustrated in FIG. 2, and the various functions of one or more of the components may be combined into a different single component.

Figure 3:
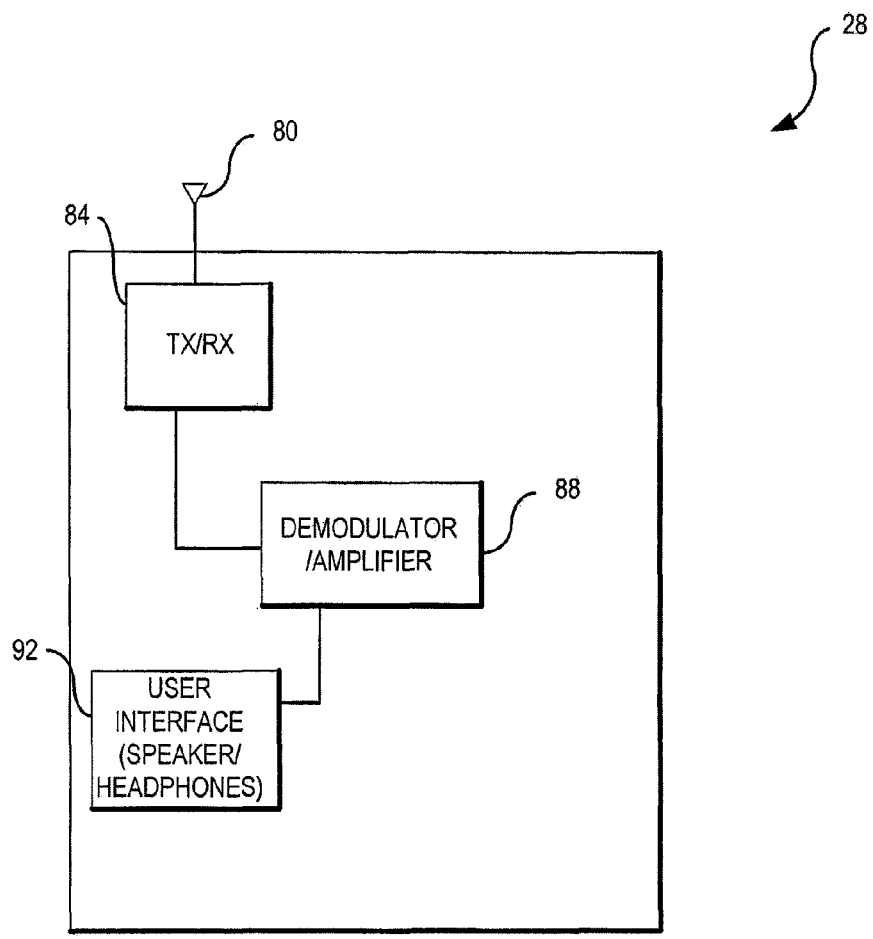
FIG. 3 is a block diagram illustration of a receiving unit of an exemplary embodiment.

With reference now to FIG. 3, a receiver 28 of an embodiment is now described. In this embodiment, the receiver 28 includes an antenna 80 that is connected to a transceiver 84. The transceiver 84 is connected to a demodulator/amplifier that receives the signals from the transceiver 84 and demodulates (or in the case of a digital transmission system, decodes) the received signal, which is then amplified and provided to the user interface 92. The user interface 92 in some embodiments includes a speaker or headphones. In some embodiments, the receiver 28, including all of the components thereof, are incorporated into a headset that may be worn by a user, thereby eliminating the need for the user to have a wire connecting the headset to the sensor unit.

Figure 4:
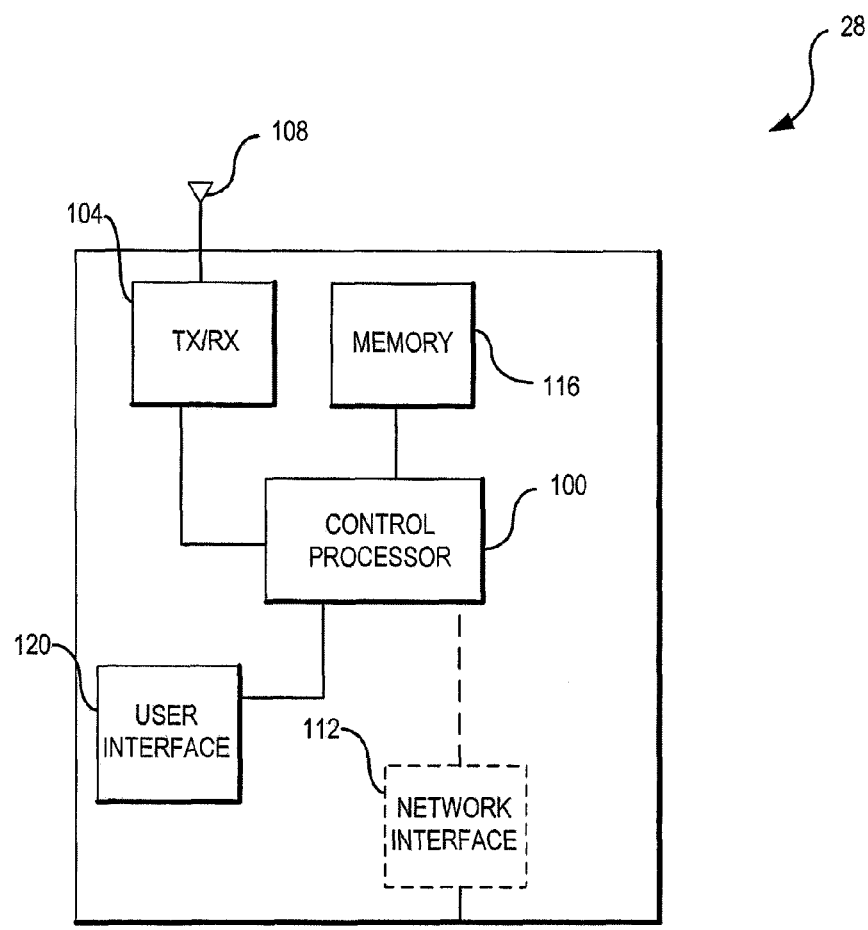
FIG. 4 is a block diagram illustration of a receiving unit of another exemplary embodiment.

In another embodiment, the receiver 28 may include additional processing capability, such as in the case of digital signal transmission used in some embodiments. In the embodiment of FIG. 4, the receiver 28 includes a control processor 100, connected to a transceiver 104 and antenna 108. Signals received at the antenna and transceiver are provided to the control processor 100, which may decode the transmission and provide an output to the user interface 120. The receiver 28, in this embodiment, includes a memory 116 that may be used to store settings and operating instructions for the control processor. The receiver 28 may also include optional network interface 112, that may be used to connect the receiver 28 to a network, such as network 32 in FIG. 1.

Figure 5:
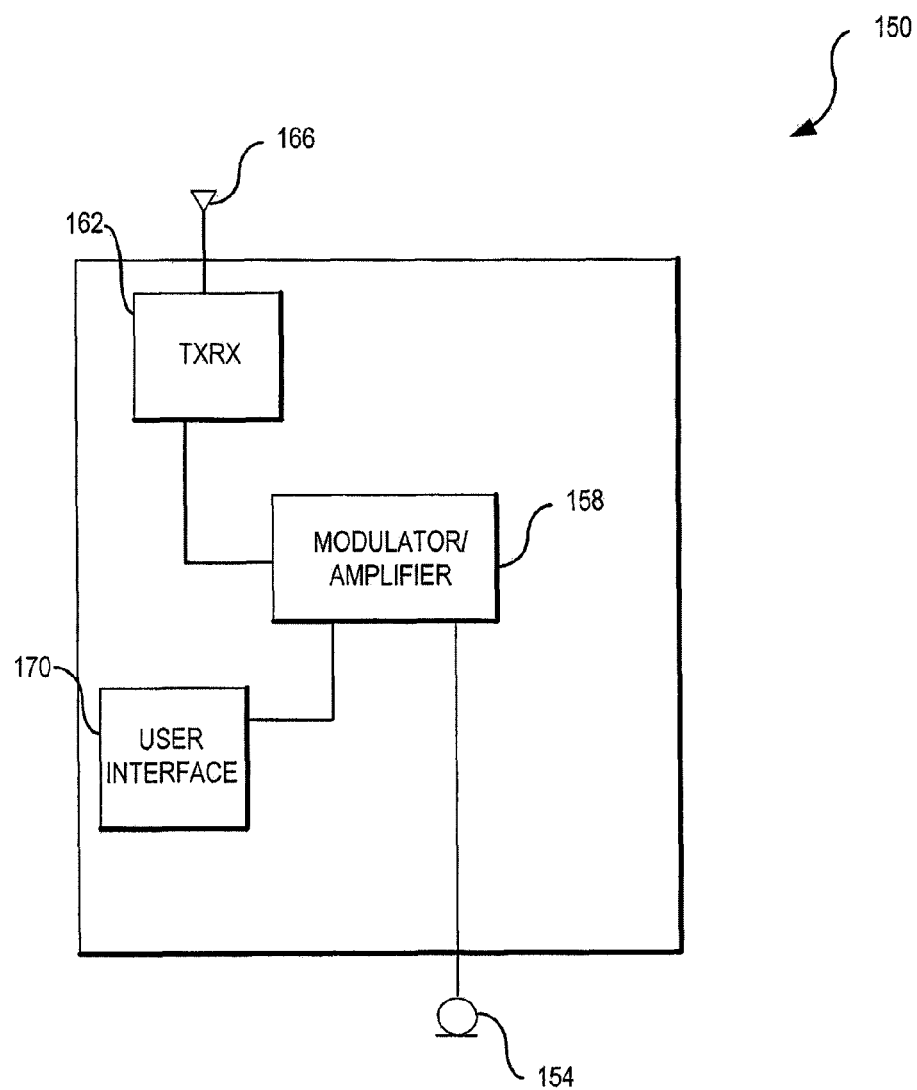
FIG. 5 is a block diagram illustration of a sensor system wireless transmitter of an exemplary embodiment.

While sensor 24 in the embodiments described with respect to FIGS. 1-4 include wireless transmission capability, the present disclosure recognizes that numerous sensors will require some modification in order to wirelessly transmit information. An exemplary embodiment of one such modification system is illustrated in FIG. 5. In this embodiment, a transmitter 150 is provided having an input 154 that is configured to be coupled to a sensor device output interface. In the exemplary embodiment of FIG. 5, the input 154 is a microphone that may be affixed to a sensor adjacent to an output speaker of the sensor. For example, many gas sniffers simply include a speaker that provides audio output. However, the input 154 may be any input suitable to receive the output from a particular sensor. Such an input 154 may include a headset jack that is configured to plug into a headset interface in an existing ultrasonic leak detector, for example. The input 154 is connected to a modulator/amplifier 158, in this embodiment. In other embodiments, the transmitter may utilize transceivers that provide digital transmission technologies, and microprocessors or control processors, along with memory, that may be required to perform such digital signal transmission. In the embodiment of FIG. 5, a transmit/receive circuit 162 is connected to the modulator/amplifier 158 that transmits an output signal to antenna 166. The transmit/receive circuit may be an FM transmitter, for example. In embodiments that provide digital transmission of information, the transmitter 150 may utilize transceivers that provide digital transmission technologies. A user interface 170 may be connected to the modulator/amplifier 158, and may be used to select, for example, transmission power and/or frequency of the transmitter 150. Such a user interface 170 may also provide a headset interface that a user may plug a headset into, thus providing a wired local headset connection as well as wireless transmission capability.

As mentioned above, systems described herein may be used in various different applications. Systems may be used in applications where a user is simply connected to the particular device using a wireless headset rather with a wired connection, to thereby provide a more convenient connection to the device, as well as reducing safety hazards that may result from being tethered to a piece of equipment. In cases where one or more users need to hear the sound, and/or get trained to hear the intricacies and peculiarities of the sounds of leaks, then the multiple users may use wireless receivers tuned to the particular device of interest. In some embodiments employing digital transmission techniques, each transmitting device may be assigned an identification, and the receiving units may be programmed to provide output from a selected device identification. Such embodiments may be useful in teaching situations where an instructor may select different devices and observe the progress of a particular student that is using that device. Such techniques may also be used in embodiments where a remote user desired to receive the output of a particular device through a network connection, such as the Internet. Such remote connection may also be useful in independent verification of the results a test instrument or device, allowing a third party such as an inspector or supervisor to receive the signal generated by the instrument and provide any required audit or verification of the signal.

Those of skill will appreciate that the various illustrative logical blocks, modules, and circuits, described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for multiple user access to a leak detection sensor, comprising:
    a sensor unit comprising a sensor element for leak detection, a sensor user interface, and a sensor wireless transceiver that transmits a broadcast signal having information corresponding to the output of the sensor user interface including sensor audio output based on the current state of the sensor element; and
    a plurality of receiving units each comprising a wireless receiver that receives said broadcast signal, and a receiver user interface connected to the wireless receiver that outputs the information corresponding to the output of the sensor user interface including the sensor audio output;
    wherein a first receiver unit associated with an instructor further includes a receiver unit transceiver and a microphone interconnected thereto, the receiver unit transceiver configured to transmit instructor audio output from the microphone in response to the output of the sensor; and
    wherein one or more other receiving units are associated with students, each including a wireless receiver that receives the information corresponding to the instructor audio output of the first receiver unit from the instructor, and a receiver user interface connected to the wireless receiver that outputs the information corresponding to the output of the sensor including the sensor audio output.

2. The system for multiple user access to a sensor, as claimed in claim 1, wherein the sensor user interface comprises an amplifier and a speaker.

3. The system for multiple user access to a sensor, as claimed in claim 1, wherein the sensor further comprises an analog to digital converter interconnected to the sensor element that outputs digital information related to the state of the sensor element, and wherein the sensor wireless transceiver transmits the digital information.

4. The system for multiple user access to a sensor, as claimed in claim 1, wherein the sensor wireless transceiver comprises a FM transmitter.

5. The system for multiple user access to a sensor, as claimed in claim 1, wherein the sensor wireless transceiver comprises a spread spectrum transceiver.

6. The system for multiple user access to a sensor, as claimed in claim 1, wherein at least a first of the receiving units further comprises a network interface and provides information related to the output of the sensor user interface to the network interface.

7. The system for multiple user access to a sensor, as claimed in claim 6, further comprising a remote receiving unit having a network interface that receives the information related to the output of the sensor user interface from the first receiving unit over a network external to the first and remote receiving units.

8. The system for multiple user access to a sensor, as claimed in claim 1, wherein the sensor unit further comprises a network interface and provides information related to the output of the sensor user interface to the network interface.

9. The system for multiple user access to a sensor, as claimed in claim 8, further comprising a remote receiving unit having a network interface that receives the information related to the output of the sensor user interface from the sensor unit over a network external to the sensor unit and receiving units.

10. A method for multiple user access to a leak detection sensing device output, comprising:

providing a sensing device having a sensor element for leak detection and a sensor wireless transceiver electrically interconnected to the sensor element;

transmitting, by a first user utilizing said sensor device, information related to the current state of the sensor element, including sensor audio output, using the sensor wireless transceiver;

receiving, at one or more receiving units, utilized by one or more respective second users, the information related to the current state of the sensor element from the sensor wireless transceiver, including the sensor audio output; and at each receiving unit, outputting the information related to the current state of the sensor element, including the sensor audio output, to a receiving unit user interface;

wherein said first user is an instructor and each of said second users is a student, and whereby said instructor utilizes said sensing element and said sensor wireless transceiver to communicate instructor audio commentary to said students, who can hear the sensor audio output as the instructor provides instruction via the instructor audio commentary.

11. The method for multiple user access to a sensing device output, as claimed in claim 10, further comprising, at least at a first receiving unit, transmitting the information related to the current state of the sensor element over a network external to the receiving unit.

12. The method for multiple user access to a sensing device output, as claimed in claim 11, further comprising:

receiving, at a remote receiving unit interconnected to the external network, the information related to the current state of the sensor element from the first receiving unit; and outputting the information related to the current state of the sensor element to a remote receiving unit user interface.

* * * * *